Figure 1:
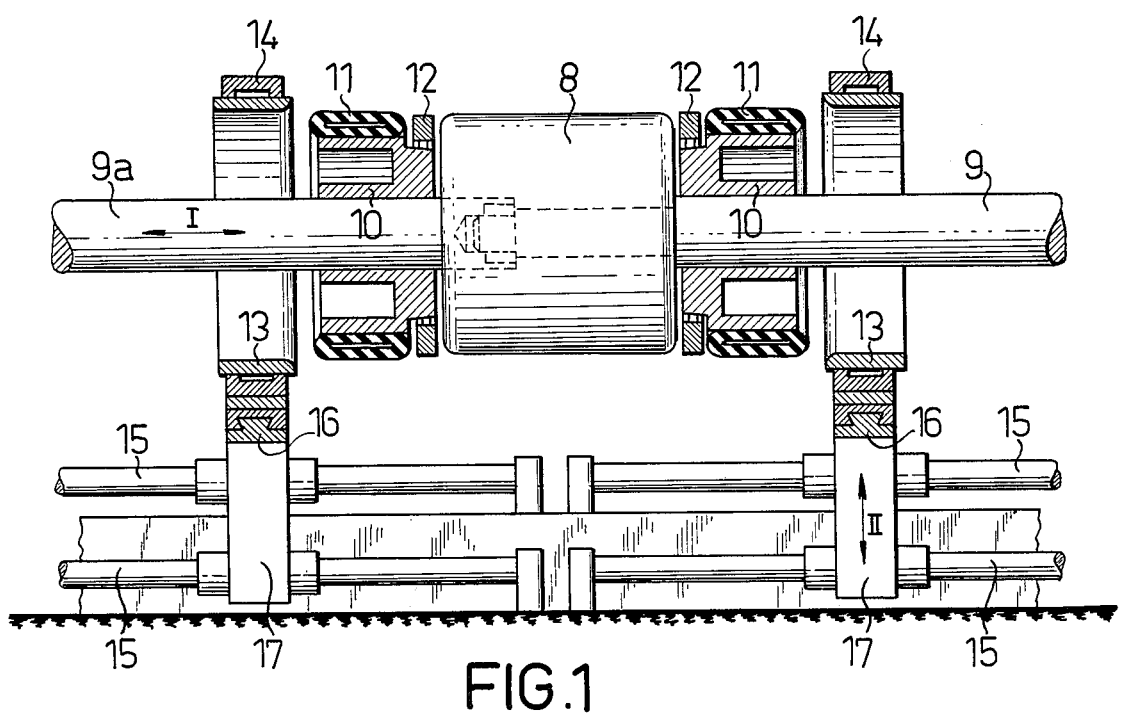
Figure 2:
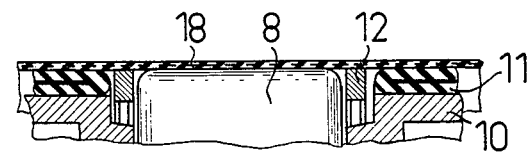

United States Patent [19]

Bullmann

[11] 3,950,212

[45] Apr. 13, 1976

[54] TIRE BUILDING MACHINE

[75] Inventor: Rolf Bullmann, Hannover, Germany

[73] Assignee: Continental Gummi-Werke Aktiengesellschaft, Hannover, Germany

[22] Filed: May 13, 1974

[21] Appl. No.: 469,461

[30] Foreign Application Priority Data
May 12, 1973 Germany.............................. 2324215

[52] U.S. Cl. ................. 156/398; 156/131; 156/403
[51] Int. Cl.² ................. B29H 17/12; B29H 17/22; B29H 17/24
[58] Field of Search ........... 156/398, 400, 401, 402, 156/131, 132, 135, 403

[56] References Cited
UNITED STATES PATENTS

| | | | |
|---|---|---|---|
| 2,951,526 | 9/1960 | Haase ................................. | 156/401 |
| 3,078,204 | 2/1963 | Appleby............................... | 156/132 |
| 3,244,575 | 4/1966 | Sabo et al............................ | 156/401 |
| 3,489,634 | 1/1970 | Pizzo et al. .......................... | 156/398 |
| 3,645,827 | 2/1972 | Frazier................................. | 156/403 |
| 3,816,218 | 6/1974 | Felten.................................. | 156/398 |
| 3,871,942 | 3/1975 | Henley et al......................... | 156/403 |

*Primary Examiner*—William A. Powell
*Assistant Examiner*—John E. Kittle
*Attorney, Agent, or Firm*—Walter Becker

[57] ABSTRACT

A tire building machine in which a tire building drum of variable diameter is connected to a rotatable driving shaft for rotation therewith while a plurality of bead applying means respectively arranged at opposite end faces includes annular sections surrounding the rotatable shaft in radially spaced relationship thereto. The machine furthermore comprises guiding means separate from the rotatable driving shaft and slidably engaged by the bead applying means which are adjustable on the guiding means in planes perpendicular to the driving shaft in two directions perpendicular to each other.

2 Claims, 7 Drawing Figures

TIRE BUILDING MACHINE

The present invention relates to a tire building machine with a building drum having a variable diameter and being equipped with annular devices for placing the bead cores onto the raw tire, said annular devices surrounding the building drum drive shaft in spaced relationship thereto and being displaceable in axial direction ahead of the two end faces of the building drum and being displaceable on guiding means separate from said drive shaft.

The placing of the bead cores and the enveloping by the end sections of the rubberized fabric layers represents an important step of the successive working operations when building up the raw tire for the pneumatic vehicle tires. The location of the bead cores toward each other and their alignment with regard to the wheel center specifically determines the seat of the finished tire on the rim and its running behavior during the use of the tire. Already slight deviations from the predetermined dimensions result in interfering unbalance and cause other phenomena which affect the usefulness and life of the tire. With heretofore known tire building machines, it was not always possible to meet the increased requirements as to precision and to maintain the predetermined narrow tolerances with regard to all parts.

It is, therefore, an object of the present invention to make possible the placing of the bead cores at high precision within the framework of the customary mass production, and it is a further object of this invention while eliminating important causes for faults to create the conditions for making pneumatic tires of uniform high quality without any material number of rejects.

These and other objects and advantages of the invention will appear more clearly from the following specification in connection with the accompanying drawings, in which:

FIG. 1 diagrammatically illustrates an overall view of a tire building machine, partially in section.

FIGS. 2–7 respectively illustrate partial views of the essential parts of the tire building machine in positions characterizing successive working operations.

The tire building machine according to the present invention which is provided with a tire building drum variable in diameter and with annular devices for applying the bead cores to the raw tire is characterized primarily in that the applying devices are adjustably arranged in guiding means for adjustment in two directions which are perpendicular to each other, said applying means being located in planes which are perpendicular to the drive shaft of the tire building drum.

With a horizontally arranged drum shaft as is usually the case with heretofore known tire building machines, the applying devices are expediently adjustable in vertical and in horizontal direction. For purposes of applying the bead cores, independently of the direction of movement, advantageously two sliding paths offset at an angle with regard to each other are provided with positively guided coupling sections. The positive connection may for instance be established by dovetail guiding means, by means of cylindrical bushings, or similar elements guided on bars.

The present invention in contrast to the prior art does no longer mount the bead applying devices in sliding bushings on the drive shaft for the tire drum. Instead, according to the present invention there is provided a separate mounting which is independent of the drum shaft and spaced therefrom. While the central mounting appears to have inherent structural simplifications, this seeming advantage is at the expense of the working precision. In view of the relative rotations and longitudinal displacements of the core applying devices on the drum shaft, the bearing bodies are subjected to an unavoidable wear which affects their central alignment with regard to the tire building drum, thereby making a uniform precise application of the cores impossible. The guiding means of the applying devices according to the invention avoids any direct contact with the drum shaft and thereby avoids the cause for undue wear with all its harmful consequences. Therefore, on one hand the guiding means of the invention will assure that its original functional condition be retained for a long period of time and on the other hand it makes it possible in view of the additional double adjustability comparable to a two-coordinate system, at any time to effect corrections or post centering with the desired and required precision. As a direct result thereof, an improved uniformity in the quality of the finished pneumatic tire will be obtained.

The advantages of the new applying devices according to the invention are further manifest when according to another important feature of the invention the devices which respectively contain two annular bodies concentrically nested in each other and adjustable relative to each other in axial direction are employed together with two inflatable bodies over which the two end faces of the building-up drum may move while the inflatable bodies are inflatable toward the inner mantle surfaces of the inner annular bodies and are adjustable in the same sense with said inner annular bodies in axial direction.

Advantageously, supporting rings are provided between the inflatable bodies and the building-up drum and are adapted in radial direction to widen toward the bead cores, said supporting rings being variable in diameter. With such a design of the tire building machine it is possible starting from the precise centering of the applied bead cores to tighten or tension the marginal sections of the fabric layers which rest on the tire building drum and belong to the understructure of the tire, and it will furthermore be possible while avoiding disadvantageous fold formations or air enclosures to fold the marginal sections of said fabric layers around the bead cores which are firmly held so as to prevent undesired changes in location thereof.

Whereas, according to the heretofore known method, the bead cores are, in order to be applied, moved against the drum shoulders and without any intermediate holding means are brought into contact with the raw tire, the present invention creates the possibility of advancing the bead cores up to a slight distance of a few millimeters toward the building-up drum and in this position temporarily to hold the bead cores in central alignment with the drum axis whereupon by expanding the drum, the end sections of the fabric layers are pulled tight below the cores. Only thereafter, the cores are in their end position firmly pressed against the raw tire, and the fabric layers are by means of the inflatable bodies in cooperation with the inner ring bodies of the applying devices, which ring bodies move back in axial direction, completely folded about the cores which are fixed by the widened supporting rings. In this way a proper central build-up of the tire beads is possible in continuously repeated sequence, with high precision without the necessity of carrying out time consuming manual correcting operations, so that also the resulting work will be independent of the skill of the respective operator.

Referring now to the drawings in detail, the illustrated tire building machine comprises as main part thereof a build-up drum 8 with variable diameter which may be of any standard type and which is mounted on a drive shaft 9 so as to rotate therewith. The drive shaft 9 is journaled in machine stands (not shown) and in customary manner comprises two sections so that after completion of the build-up operation of the tire, it will be possible after moving back the shaft section 9a to remove the finished raw tire from the drum 8. The shaft section 9a can be axially moved in opposite directions as indicated by the double arrow I. In front of the end faces of the tire building drum 8, two inflatable bodies 11 are provided on cylindrical supports 10 which are non-rotatably but axially displaceably connected to the drive shaft 9. The inflatable bodies 11 which in FIG. 1 are shown in deflated condition form at both sides of the drum 8 substantially the continuations of the cylindrical outer mantle of the building drum 8 when the latter has its smallest diameter. Between the inflatable bodies 11 and the building up drum 8 there are provided supporting rings 12 which are variable in diameter and are composed for instance of radially displaceable segments. These supporting rings 12 are non-rotatably but axially displaceably connected to the drive shaft 9 or supports 10. The supporting rings 12 bridge the space between the inflatable bodies 11 and the respective adjacent end face of the building drum and are adapted from their rest position in FIG. 1 to be enlarged to a considerably greater diameter.

The pertaining core applying device comprises two annular bodies 13, 14 which in pairs are respectively arranged at both ends of the building-up drum 8. These annular bodies 13, 14 are axially adjustable relative to each other and are concentrically placed one in the other while being able together to be moved in the direction of the double arrow I relative to the building-up drum 8. To this end, the said annular bodies 13, 14 are in a positive connection movably guided on slide guiding means 15 while said guiding means 15 in their turn are in spaced relationship to the building-up drum 8 and in axis parallel direction thereto firmly mounted on the machine frame or a common foundation. In the specific example illustrated, the guiding means 15 are formed by cylindrical bars in arrangement of pairs in order to avoid undesired angular displacements of the annular bodies 13, 14. However, instead also flat guiding means or bars with non-round cross sectional surface may be provided. The connection of the annular bodies 13, 14 with the guiding means 15 is effected by two couplings 16, 17 which are movable in planes extending at a right angle to said guiding means 15 and which are movable perpendicularly with regard to each other. Each of the couplings 16, 17 forms by iteslf relatively short guiding means with movable parts which positively engage each other, for instance in the manner of dovetail shaped guides as they are indicated for the couplings 16, in FIG. 1 in section. By means of non-illustrated actuating mechanisms of any standard type, the coupling parts can be moved relative to each other in such a way that the annular bodies 13, 14 can through the intervention of the coupling 17 be moved in the direction of the double arrow II upwardly and downwardly and by means of the coupling 16 can be moved vertically thereto through the drawing plane relative to the drum shaft 9.

Specifically considering the operations in connection with the application of the bead cores, the operation of the described tire building machine is as follows: at the beginning of the building-up operations, the bead applying devices are moved back to their rest positions in which they are spaced by a relatively great distance from the building-up drum 8. The building-up drum 8 itself is in conformity with FIG. 2 contracted to its smallest diameter and together with the deflated inflatable body 11 and the likewise pulled-in supporting rings 12 forms a continuous cylindrical mantle surface on which the rubberized fabric layers 18 are built up for the carcass of the raw tire by intended layers and in the intended sequence. The bead cores are from the very start kept in readiness on both applying devices.

Figure 3:
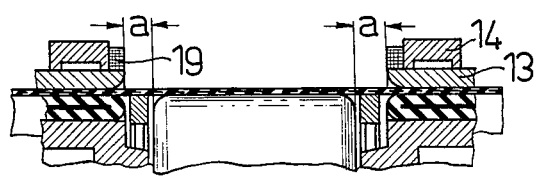

The next following step after completing the tire under-structure is commonly known as pre-positioning the cores inasmuch as the applying devices with the bead cores 19 resting on the inner annular bodies 13 are in conformity with the illustration in FIG. 3 moved toward the building-up drum 8 so as to be spaced therefrom by a distance $a$ and are temporarily held in this position. The distance depends primarily on the respective structural features of the drum shoulders. In the specific embodiment shown, the distance $a$ corresponds substantially to the width of the supporting rings 12 or slightly exceeds the same. At any rate the distance $a$ is to be selected so that an unimpeded tightening or tensioning of the fabric layers 18 during the expansion of the building-up drum 8 will be assured.

Figure 4:
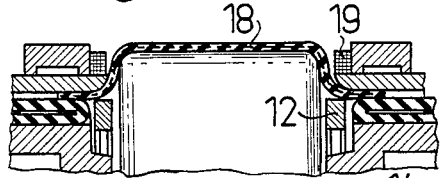
Figure 5:
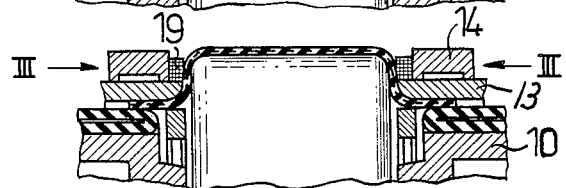

Closely related to the pre-positioning of the bead cores is the folding over of the fabric layers 18. This folding operation will be initiated with the expansion of the building-up drum 8 (FIG. 4). The applying devices may be moved further toward the drum shoulders without, however, causing the bead cores 19 to be brought in pressing contact with said shoulders. Only after the largest drum diameter has been obtained, the pressing proper of the bead cores (FIG. 5) against the drum will be effected. In this connection, the outer annular bodies 14 of the applying devices are in the direction of the arrows III advanced against the building-up drum 8 and in the course of this axial movement of the outer annular bodies 14, the associated cores 19 are carried along and are in their intended end position pressed against the drum shoulders embraced by the overhanging fabric layers 18.

Figure 6:
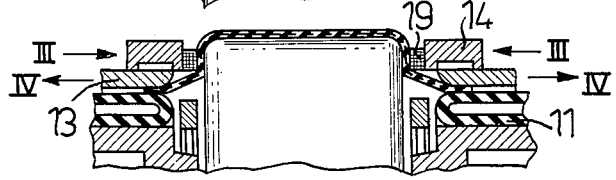
Figure 7:
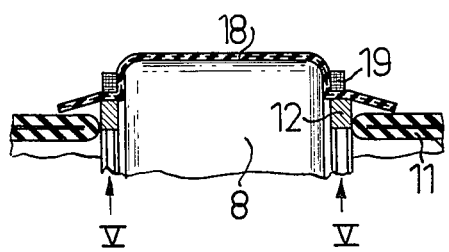

The firm seat of the bead cores 19 permits the subsequent tightening of the fabric layers in conformity with FIG. 6 by clamping their free marginal edges between the inner annular bodies 13 of the applying devices and the inflatable bodies 11 placed under inner pressure, and by outward movement of said two parts in the direction of the arrow IV. The outer annular bodies 14 will not be influenced by this displacement and will furthermore hold the bead cores 13 in pressed-on condition. The simultaneously expanding supporting rings 12 (arrow V) will push into the gap created by the withdrawal of the annular bodies and inflatable bodies. In this way, in conformity with FIG. 7, the central position of the bead cores 19 will be assured also after a subsequent withdrawal of the outer annular bodies 14. The further building-up of the raw tire may then be continued by folding back the fabric marginal areas about the bead cores in a manner known per se.

It is, of course, to be understood that the present invention, is, by no means, limited to the specific showing in the drawings, but also comprises any modifications within the scope of the appended claims.

What I claim is:

1. A tire building machine which includes in combination: rotatable shaft means, a tire building drum of variable diameter connected to said shaft means for rotation therewith, bead core applying means respectively arranged opposite each end face of said drum, each applying means including a bead core holder having two coaxially arranged, relatively slidable annular bodies one within the other surrounding said shaft means in radially spaced relationship thereto and axially movable to position a bead core against tire fabric on the end face of said drum, two inflatable bodies mounted on said shaft means and respectively arranged at opposite ends of said drum inside of said annular bodies for cooperation with the inner of the respective adjacent annular bodies, the annular bodies of each of said bead applying means being movable over the respective adjacent inflatable body, and each of said inflatable bodies being expandable so as to engage the respective adjacent inner annular body, two supporting rings mounted on said shaft means and respectively arranged at opposite ends of said tire building drum spaced therefrom between the latter and the respective adjacent inflatable body, each said supporting ring being variable in diameter to expand radially outwardly against said fabric and bead core, each of said supporting rings having a width corresponding approximately to the width of the bead cores to be applied, the guiding means spaced from said shaft means and slidably supporting each of said bead core applying means for guiding said bead core applying means in the axial direction of said shaft means, said bead core applying means additionally being adjustable transversely of said shaft means on said guiding means perpendicular to said shaft means independently in two directions perpendicular to each other.

2. A tire building machine which includes in combination: rotatable shaft means, a tire building drum of variable diameter connected to said shaft means for rotation therewith, bead core applying means respectively arranged opposite each end face of said drum, each applying means including a bead core holder having two coaxially arranged relatively slidable annular bodies one within the other surrounding said shaft means in radially spaced relationship thereto and axially movable to position a bead core against tire fabric on the end face of said drum, and guiding means spaced from said shaft means and slidably supporting each of said bead core applying means for guiding said bead core applying means in the axial direction of said shaft means, said bead core applying means additionally being adjustable transversely of said shaft means on said guiding means perpendicular to said shaft means independently in two directions perpendicular to each other, an inflatable body adjacent each end of said tire drum carried by said shaft means within said bead applying means and of slightly less diameter than said slidable inner and outer bodies to accommodate tire fabric between said inflatable body and the inner of said bodies, said inner body being slidable within said outer body outwardly of said bead core when said core is clamped against the tire drum, said inflatable body holding said fabric against said inner body when expanded, and expansible means carried by said shaft means within each bead core, and expansible radially to clamp said tire fabric against said bead core after said inflatable body has held it against said inner body.

* * * * *